July 28, 1970  P. J. HECKMAN, JR  3,521,940

ADJUSTABLE ATTENUATION LASER SAFETY WINDOW

Filed Oct. 31, 1967

INVENTOR
PAUL J. HECKMAN, JR.

BY
MICHAEL F. OGLO
ROY MILLER
ATTORNEYS.

United States Patent Office 3,521,940
Patented July 28, 1970

---

3,521,940
ADJUSTABLE ATTENUATION LASER SAFETY WINDOW
Paul J. Heckman, Jr., Pasadena, Calif., assignor to the United States of America as represented by the Secretary of the Navy
Filed Oct. 31, 1967, Ser. No. 679,313
Int. Cl. G02b 5/30
U.S. Cl. 350—148                3 Claims

---

ABSTRACT OF THE DISCLOSURE

An adjustable laser protection window is of special utility as a viewing window for the helmet of a diver who must take sightings upon a laser beam. The window comprises a fixed lens and a partially rotatable lens in optical series. The fixed lens is a substrate of transparent plane polarizing sheet material, having a monochromatic rejection filter formed on one face. The partially rotatable lens is of like plane polarizing material. A manual adjustment permits adjusting the relative angular displacement of the axes of polarizations of the two lenses.

---

BACKGROUND OF INVENTION

This invention relates to improvements in laser safety glasses.

An object of this invention is to provide an adjustable laser safety glass which has a range of attenuations.

Another object is to provide an adjustable laser safety glass of particular convenience to use as the window of a diver's helmet.

BRIEF DESCRIPTION OF THE DRAWING

Other objects and many of the attendant advantages of this invention will be readily appreciated as the same becomes better understood by reference to the following detailed description when considered in connection with the accompanying drawings wherein.

DESCRIPTION OF THE PREFERRED EMBODIMENT

Figure 1:
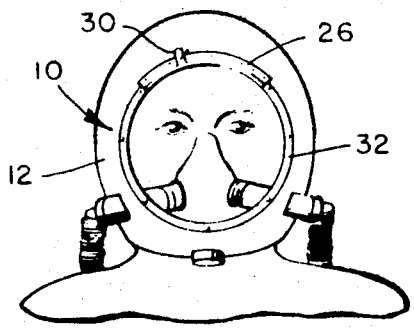
FIG. 1 is a front elevation of a diver's helmet which incorporates the present invention.

Referring now to the drawing, and in particular to FIG. 1, the subject of the invention is an adjustable laser protection window 10, for use in a diver's helmet 12. Window 10 simultaneously serves as a viewing window, and an eye protection filter providing pre-adjustable attenuation to a laser beam of given wavelength. It is of special utility where divers are required to take sightings upon laser beams emanating from underwater instrumentation. An illustration of such underwater instrumentation will be discussed in the description of the operation of window 10, later in this specification.

The helmet 12 is conventional. It is a type of headgear used by SCUBA (Self-Contained Underwater Breathing Apparatus) divers. The body of the helmet is a hard shell of durable and opaque material such as fiber glass. In use, the interior of the helmet is filled with breathing gases regulated to ambient depth pressure, as is normal with SCUBA diving equipment.

Figure 2:
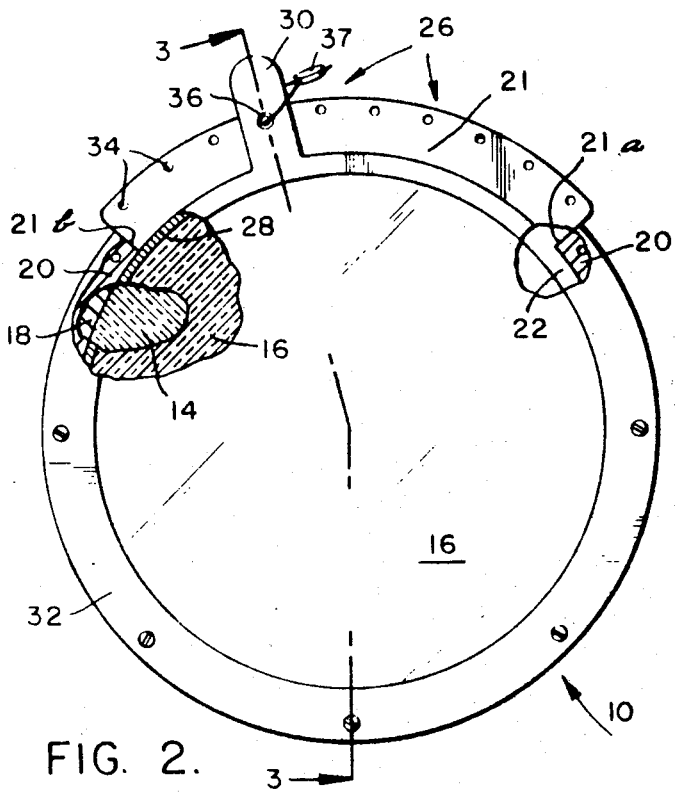
FIG. 2 is an enlarged front elevation of the viewing window of the diver's helmet of FIG. 1, certain portions being cut away.
Figure 3:
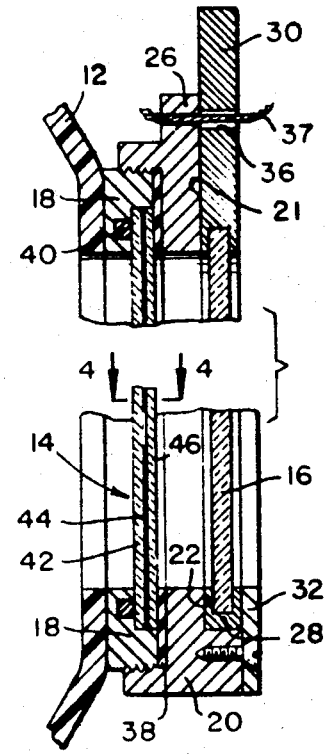
FIG. 3 is an enlarged section taken along line 3—3, FIG. 2.

Referring now to FIGS. 2 and 3, the mechanical construction of window 10 will now be described. (The optical construction will be described in subsequent paragraphs.) Window 10 is a circular assembly which houses a rear and front pair of lenses consisting of a polarizer and filter 14, and a front partially rotatable polarizer 16, respectively. It is bonded to the helmet along the perimeter of the viewing opening formed in the helmet shell. Rear lens 14 is fixedly supported in a counterbore in the front surface of a rear lens ring 18. Front lens unit is supported in a manner allowing adjustable rotation through an arc of 90°, as follows. A front lens ring 20 is threadedly secured to the front end of rear lens ring 18. An undercut sector 21 is formed in the front face of ring 20. Sector 21, which extends between radial ledges 21a and 21b, has an arc length somewhat more than 90° and is bilaterally centered in the upper half of ring 20. The remaining somewhat less than 270° of the ring, extending clockwise from radial ledge 21a to 21b, has an inside shoulder 22 formed therein. The surfaces of undercut sector 21 and counterbore or shoulder 22 are mutually coplanar. The structural difference between sector 21 and shoulder 22 is that the total radial width of ring 20 is undercut in sector 21, whereas only a portion of the radial width is undercut in forming shoulder 22. A quadrant 26 is formed as an integral radially projecting appendage to the front lens ring. The front face of quadrant 26 is coplanar with the face of undercut sector 21 and shoulder 22. The periphery of front lens 16 is encased in a channel shaped rim 28. A radial lens positioning arm 30 is formed as an integral appendage to the rim. Rim 28 is slidingly seated in the arcuate shoulder 22 with its radial arm 30 disposed across the face of sector 21. An arcuate retaining plate 32, which is co-extensive with arcuate shoulder 22, is bolted onto the face of front lens ring 20. Arcuate shoulder 22 and retainer ring 32 together form a track which slidingly supports rim 28 for rotation. The ledges 21a, 21b at the sides of undercut sector 24 cooperate with radial arm 30, serving as stops to limit the rotational travel of front lens 16 between position 90° apart. Quadrant 26 contains a series of ten index holes 34, spaced 10° apart, and arm 22 contains a single hole 36 at a radial location for registry with holes 34. Hole 36 and holes 34 provide ten index stations for receiving a wire seal 37 to lock the adjustable polarizer 16 at any of the 10° increments of its 90° of possible rotation. The sliding fit between rim 28 and the track formed by the counterbore or shoulder 22 and retainer ring 32 is not watertight. Therefore, when helmet 12 is immersed, the space behind adjustable polarizer 16 becomes flooded. A gasket 38 and an O-ring 40 prevent leakage of water behind the polarizer and rejection filter 16.

Figure 4:
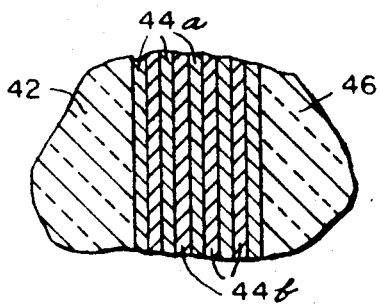
FIG. 4 is a greatly enlarged section taken along line 4—4, FIG. 3.

As best shown in FIG. 4, rear monochromatic filter and polarizer lens 14 is a composite construction consisting of a substrate 42 of plane polarizing sheet material, having a multiple-layer optical interference filter 44 deposited on to its front face. A protective transparent sheet 46 is bonded over the interference filter. Filter 44, which is conventional per se, comprises successive deposits of thin films, of alternately high and low index of refraction dielectric materials 44a and 44b. The films are of precise thickness relative to the wave length of the laser beam to be attenuated. This construction provides a predetermined degree of attenuation to light energy of this wavelength, while allowing transmission of the visible light wavelength bands thereabove and therebelow. For further details of the construction of such monochromatic rejection filters, reference is made to "Electromagnetic Theory of Propagation, Interference and Defraction of Light," by Max Born and Emil Wolf, published by Pergamon Press 1959 at p. 70; and "Applied Optics and Optical Engineering," Academic Press, 1965, vol. 1, pp. 299–315. The polarizing substrate 42 has a radial polarizing axis, not shown, and is mounted in rear lens ring 18 with this axis in a predetermined angular position.

Front lens unit 16 is of the same polarizing sheet material as substrate 42. It is mounted in rim 22 with its axis of polarization in a predetermined position relative to arm 30 such that the axis is parallel to that of substrate 42 when arm 30 is at limit stop 21b, and perpendicular when at limit stop 21a.

Figure 5:
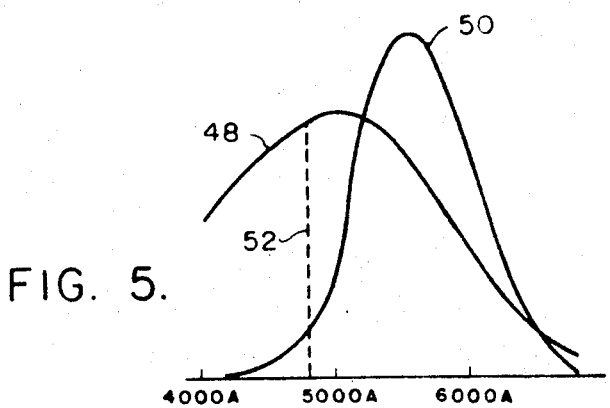
FIG. 5 is a spectrum diagram presented as an aid in describing the utility of the invention.

Operation of adjustable laser protection window 10 will now be described with reference to a specific situation of a diver performing underwater surveying, using laser beam surveying equipment (not shown). Briefly, the laser beam surveying equipment consists of a laser beam projector having a theodolite mount, and a portable "target" maintained in precise vertical attitude by an anchor and float structure. The source used in the beam projector is chosen to provide a beam wave length having the combination of good water transmission characteristics and good visual response. This characteristic is illustrated in the spectrum diagram of FIG. 5 wherein curve 48 represents relative transmission characteristics of water, and curve 50 represents relative visual response. A suitable laser beam source would be an argon gas laser which provides a monochromatic beam having a wave length of 4880 Angstroms, represented by dashed lines 52. This wavelength of beam can visually be detected, under water, at 300 feet, with beam dispersion effects limited to 45 mm. The portable target has a cursor through which the laser beam may be sighted when precisely aligned with the target. A diver operates the "target" by visually looking through the cursor at the laser source. It is this member of the diving party for whom adjustable laser protection window 10 is intended.

In the above described situation, the multi-layer optical interference coating 44 of rear lens 14 would be chosen to reject the 4880 Angstrom energy by a predetermined minimum level of attenuation. This minimum level is chosen to protect the diver's eye from incidental short periods of exposure to the laser beam. The Diving Master in charge of the operation must know the approximate distance between the laser source and the diver taking the sighting. Prior to the dive the Diving Master adjusts positioning arm 30 to the desired index hole station to set the relative positions of lenses 14 and 16 to provide the diver with additional attenuation. This additional attenuation results from relative displacement of the axes of polarization of the pair of polarizing lenses disposed in series. The needed settings may be obtained from conventionally derived calibration charts. Arm 30 is locked by wire seal 37 prior to start of the diving operation. As a further protection, the Diving Master continuously monitors the relative positions of the diver and the laser beam projector by sonar, so that he can order the laser beam shut off if a diver strays closer to the source than the setting of window 10 permits.

It will be appreciated that what is provided is a laser eye protection lens system which may be adjusted for a variety of expected laser beam intensities, without having to physically change filter lenses for different distances between diver and laser source.

Obviously many modifications and variations of the present invention are possible in the light of the above teachings. It is therefore to be understood that within the scope of the appended claims the invention may be practiced otherwise than as specifically described.

The invention described herein may be manufactured and used by or for the government of the United States of America for governmental purposes without the payment of any royalties thereon or therefor.

What is claimed is:

1. In an adjustable attenuation safety glass unit for use in a worksite illuminated by laser energy of a predetermined laser wavelength, the combination comprising:
   an opaque shield member having a viewing opening;
   a rear lens ring, having an inner diameter of substantially the same size as the viewing opening, mounted to, and in front of, the opaque shield member and having a counterbore at its front surface and an O-ring groove located on the rear surface of the counterbore;
   an O-ring fitted in the groove in the rear lens ring;
   a rear lens comprising a first transparent sheet of a plane polarizing material having a multiple-layer optical interference-type monochromatic filter formed on one of its faces, the filter providing predetermined attenuation of transmission of laser energy at the determined wavelength and substantially transmitting visually perceptible illumination at wavelengths above and below said predetermined wavelength, the rear lens being disposed flush against the O-ring, and in the counterbore, the front side of the rear lens being substantially flush with the front face of the rear lens ring;
   a gasket, concentric with, and in contact with the front part of, the rear lens, having an inner diameter of the same size as the viewing opening, and an outer diameter substantially the same as that of the rear lens ring;
   a front lens ring, threaded to the rear lens ring snugly against the gasket, so that the opaque shield member is watertight, and having a counterbore in its front surface and a substantially 90° sector cutout which is coextensive with the front lens counterbore;
   a rim, whose cross-section is channel-shaped radially inwardly, rotatably disposed in a non-watertight fashion in the counterbore of the front lens ring, and having a radially outwardly extending arm, the arm being positioned in the 90° sector cutout, of the front lens ring, for manually rotating the rim;
   a front lens comprising a second transparent sheet of plane polarizing material, mounted within the channel-shaped contour of the rim, so that the front lens is rotatable with the rim, thereby adjusting the relative angular displacement of the axes of polarization of the first and second sheets of polarizing material to selectively provide a variable degree of attenuation which augments that of the interference filter;
   means for locking the rim in selected relative angular displacement with respect to the front lens ring, the means including an aperture in the arm and a series of apertures in the front lens ring which are registerable with the arm aperture;
   an arcuate retaining plate having the same inner and outer diameters as the front lens ring, and mounted to the front lens ring so as to permit the arm to rotate the rim in an arc of approximately 90°; and
   means for locking the rim in selected relative angular displacement with respect to the front lens ring, the means including an aperture in the arm and a series of apertures in the front lens ring which are registrable with the arm aperture.

2. Apparatus in accordance with claim 1, wherein the interference filter being formed on the face of the first transparent polarizing sheet comprises successive deposits of thin films consisting of alternate materials having a high index of refraction and a low index of refraction.

3. A combination according to claim 1, wherein the opaque shield member is an underwater helmet.

References Cited

UNITED STATES PATENTS

| | | | |
|---|---|---|---|
| 2,298,059 | 10/1942 | Land | 350—148 |
| 2,320,375 | 6/1943 | Moulton | 351—49 |
| 2,494,543 | 1/1950 | Clarke | 350—148 |
| 2,761,797 | 9/1956 | Young | 350—166 |
| 3,267,807 | 8/1966 | Swope et al. | 351—44 |

DAVID SCHONBERG, Primary Examiner

M. J. TOKAR, Assistant Examiner

U.S. Cl. X.R.

350—166